No. 889,771. PATENTED JUNE 2, 1908.
A. DRAWS.
SAW SWAGE.
APPLICATION FILED AUG. 5, 1907.

WITNESSES
INVENTOR
August Draws
BY Munn & Co
ATTORNEYS

UNITED STATES PATENT OFFICE.

AUGUST DRAWS, OF HOUGHTON, MICHIGAN.

SAW-SWAGE.

No. 889,771.  Specification of Letters Patent.  Patented June 2, 1908.

Application filed August 5, 1907. Serial No. 387,071.

*To all whom it may concern:*

Be it known that I, AUGUST DRAWS, a citizen of the United States, and a resident of Houghton, in the county of Houghton and State of Michigan, have invented a new and Improved Saw-Swage, of which the following is a full, clear, and exact description.

This invention relates to means for setting teeth on wood saws, and more particularly to a swage for setting racker teeth on saws driven by power or operated by hand, such teeth that have a chisel cut being located between other teeth that are of an angular form, and rout out chips as well as cut laterally so as to produce clearance for the saw blade when in motion.

The object of my invention is to provide novel features of construction for a saw swage of the character indicated, which adapt it for exact operation and enable the speedy and uniform setting of the racker teeth of a saw blade.

The invention consists in the novel construction and combination of parts, as is hereinafter described and defined in the appended claims.

Reference is to be had to the accompanying drawings forming a part of this specification in which similar characters of reference indicated corresponding parts in all the views.

Figure 1:
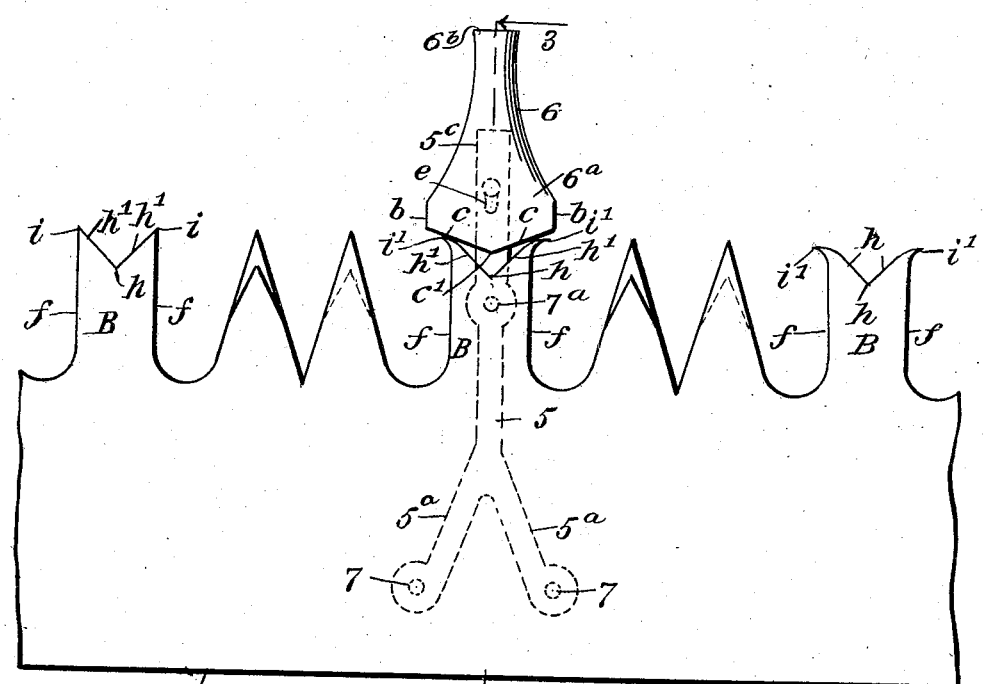
Figures 2, 3:
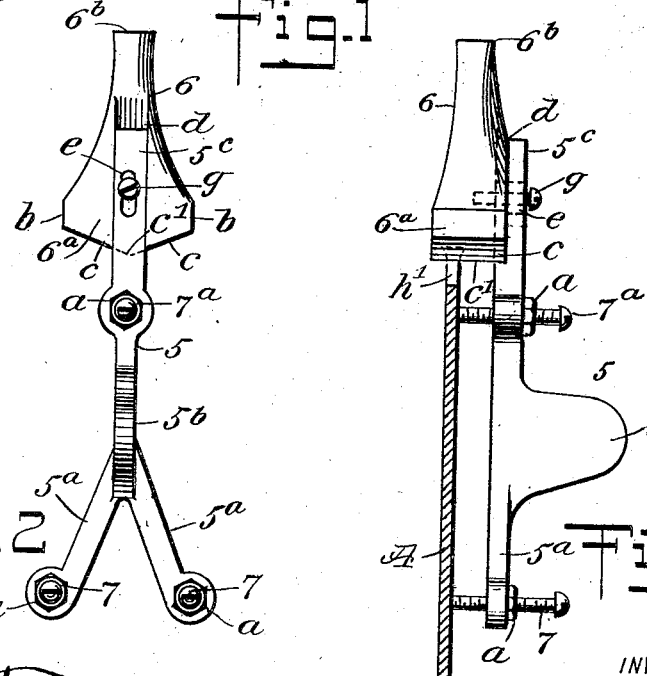

Figure 1 is a rear elevation of the improved swage, applied for setting the racker teeth on a wood cutting saw; Fig. 2 is a plan view of the swaging tool, and Fig. 3 is a longitudinal sectional view of the same as applied, taken substantially on the line 3—3 in Fig. 1.

The improved swaging tool comprises two principal portions, 5, 6, and minor details that co-act with said portions.

The part 5 is in the form of a metal bar, that is forked at one end, providing two angularly divergent limbs $5^a$ thereon. A flange $5^b$ projects upward from the part 5, which may be termed a frame bar, which flange that is designed for manipulation as a grip piece is positioned near to the bifurcated members $5^a$. In each limb $5^a$, near the free end thereof, a vertical threaded perforation is formed, and in each of said perforations a set screw 7 is screwed. A short distance forward of the grip flange $5^b$, a third threaded perforation is formed in the frame bar 5, and in it is inserted a set screw $7^a$ that is similar to the screws 7. Upon each of the set screws 7, 7, $7^a$, a jam nut $a$ is mounted, said nuts having bearing upon the side of the frame bar from which the grip flange $5^a$ projects.

The part 6, before mentioned, constitutes a swage block for engagement with the teeth of a saw, and as shown, consists of a hardened steel block having parallel sides $b$, $b$ near one end thereof, that is of a suitable width and forms the strike head $6^a$ for the swage block. The end wall of the strike head $6^a$ has obtuse angular form, produced by the two similar walls $c$, $c$, that incline or diverge at the angle $c'$, which is at the transverse center of the strike head. At a suitable distance from the head walls $c$, $c$, the body of the swage block 6 is contracted and terminates at the other end of said block in a poll $6^b$ of a preferably cylindrical shape, and thus adapted for receiving blows from a hammer. In the upper side of the swage block 6, a flat bottomed channel $d$ is formed and as indicated in Fig. 3 the adjacent end portion $5^c$ of the frame bar 5 is embedded in said channel.

Near the end of the frame bar 5, which loosely seats in the channel $d$, a short, longitudinal slot $e$ is formed in said frame bar, and through said slot, a keeper bolt $g$ is passed and screwed into a threaded perforation in the swage block 6, so as to have a loose contact at its head with the upper edges of the slot $e$.

The type of wood saw shown at A is well known, and as before stated the improved tool is specially well adapted for increasing the cutting power of certain teeth thereon known as "racker" teeth and designated by the letter B. Each tooth B is formed with its body in the same plane with that of the saw blade A and of a suitable width defined by parallel side edges $f$. In the free end of each tooth B, an obtuse angular notch is formed, the angle $h$ being formed by two oppositely inclined edges $h'$ that at their outer ends merge into the side edges $f$ and produce acute angular tooth members $i$, $i$.

It has been found that the cutting action of the racker teeth B is greatly increased, and the resistance to the reciprocation of the saw blade correspondingly diminished, if the angular teeth $i$, $i$ are bent outward and thus given a shearing cut when in operation, said form appearing at $i'$ in Fig. 1.

It will be seen that by an adjustment of the set screws 7, 7, $7^a$, the tool may be supported upon the saw blade A by seating these screws thereon; it being understood that the blade is supported by a clamp or other means so that the teeth will be disposed uppermost while the sides of the blade are in vertical planes.

The operation is self evident, as it is only necessary to seat the screws 7, 7, 7ª, against an adjacent side of the saw blade A and rest the swage block upon a tooth B so that the inclined edges $c, c$ rest upon the tooth members $i, i$. The tool being held in position with one hand gripping the flange $5^b$ with a hammer manipulated in the other hand, a blow is struck upon the poll end of the swage block 6, which will obviously bend the points of the tooth members $i, i$ outward, or oppositely and give said points a curvature as shown at $i'$.

The provision of a sliding connection between the swage block 6 and frame bar 5 is advantageous, in that it permits the proper seating of the gage block upon a tooth, and prevents recoil when the swage block is struck.

Obviously, any desired degree of outward curvature may be given to the points of the tooth members $i$, by a repetition of the blow struck upon the swage block.

Having thus described my invention, I claim as new and desire to secure by Letters Patent:

A saw swage comprising a frame bar provided with means for engaging the saw to position the bar, said bar having at its upper end a longitudinal slot, and a swage block provided on its front with a vertical groove in which slides the end of the frame bar, a set screw traversing the slot of the frame bar and threaded into the swage block, the upper end of said block being formed into a poll and the lower end being provided with flat surfaces arranged at an obtuse angle to each other for the purpose set forth.

In testimony whereof I have signed my name to this specification in the presence of two subscribing witnesses.

AUGUST DRAWS.

Witnesses:
FRANK HILDEBRANT,
JAS. T. HEALY.